United States Patent [19]

Polcer

[11] Patent Number: 5,047,220

[45] Date of Patent: Sep. 10, 1991

[54] CATALYTIC DENITRIFICATION CONTROL PROCESS AND SYSTEM FOR COMBUSTION FLUE GASES

[75] Inventor: John Polcer, Brookside, N.J.

[73] Assignee: Foster Wheeler Energy Corporation, Clinton, N.J.

[21] Appl. No.: 329,143

[22] Filed: Mar. 27, 1989

[51] Int. Cl.$^5$ .......................... B01J 8/00; C01B 21/00; G01N 21/00

[52] U.S. Cl. .................................... 423/239; 423/235; 422/62

[58] Field of Search .................... 423/239, 239 A, 235, 423/235 D; 422/62

[56] References Cited

U.S. PATENT DOCUMENTS

| | | | |
|---|---|---|---|
| 4,473,536 | 9/1984 | Carberg et al. | 423/239 |
| 4,473,537 | 9/1984 | Ford et al. | 423/239 |
| 4,565,679 | 1/1986 | Michalak et al. | 423/239 |

Primary Examiner—Gregory A. Heller
Attorney, Agent, or Firm—Marvin A. Naigur

[57] ABSTRACT

A control process and system for catalytic denitrification of $NO_x$ containing flue gases derived from a fuel combustion unit such as a gas turbine by ammonia addition to the flue gas upstream of a catalytic denitrification unit. The ammonia addition rate is controlled based on a basic signal which is generated based on functional parameters including the fuel being burned, its combustion temperature, flue gas flow rate, ammonia flow rate and the catalytic activity, so as to inject initially into the flue gas stream less ammonia than is theoretically required. Then the $NO_x$ concentration in the exhaust gas downstream of the catalytic unit is compared with the appropriate standard, the ammonia quantity initially being added is further adjusted until the $NO_x$ concentration is gas emitted to the atmopshere is reduced sufficiently to meet local clean air standards while avoiding unsatisfactory excess ammonia injection and system oscillation.

11 Claims, 1 Drawing Sheet

CATALYTIC DENITRIFICATION CONTROL PROCESS AND SYSTEM FOR COMBUSTION FLUE GASES

This invention pertains to control of catalytic denitrification process and systems for combustion flue gases derived from fuel combustion processes. It relates especially to a control process system for ammonia injection into such flue gas upstream of a catalytic denitrification unit to reduce $NO_x$ concentrations to a suitable level for flue gas streams discharged to the atmosphere.

To achieve and maintain established clean air standards in industrial areas, it is necessary to remove excessive concentrations of nitrous oxides ($NO_x$) from exhaust gases emitted by fuel combustion processes, such as flue gas from a combustion boiler or gas turbines exhaust gases. A well known process for such nitrous oxide removal utilizes a reducing agent such as ammonia which is added to the exhaust gas stream ahead of a catalytic denitrification unit. Such processes are generally disclosed in U.S. Pat. No. 3,864,451 to Lee et al, U.S. Pat. No. 3,887,683 to Abe et al and U.S. Pat. Nos. 4,010,238 and 4,466,241 to Inui et al In such flue gas denitrifcation systems, the amount of ammonia added to the raw flue gas must be controlled within close limits, so as to meet desired limits for $NO_x$ contained in the gases downstream of the catalytic denitrification unit which are emitted to the atmosphere and to avoid contaminating the environment with unreacted ammonia. However, the prior art control systems are undesirably complicated and expensive, so that improved control systems for $NO_x$ removal from flue gases which are simpler but effective are desired.

SUMMARY OF INVENTION

The present invention provides a control process and system for ammonia addition to combustion flue gas streams containing excessive nitrogen oxides ($NO_x$) upstream of a catalytic denitrification unit. The process controls the injection of desired amounts of ammonia into the combustion flue gas stream so as to produce a desired low concentration of ammonia and $NO_x$ contained in the flue gas emitted to the atmosphere. The process effectively controls concentration of nitrous oxides ($NO_x$) in the combustion flue gas for a wide range of gas flow rates and initial nitrous oxides concentrations, such as initially at least about 20 and up to about 200 parts per million $NO_x$ in the flue gas stream.

The control system includes a source of hot combustion gases such as produced from a fuel fired boiler or a gas turbine power plant, nozzle means for injecting ammonia into the flue gas stream a catalytic denitrification unit provided in the flue gas down stream downstream of the ammonia injection nozzle means, and an exhaust conduit or stack leading to the atmosphere and including a gas sampling and $NO_x$ analyzer device. The control process utilizes a sequenced control procedure for accomplishing the desired ammonia addition to the exhaust gas, so as to gradually but quickly approach the ammonia injection rate required to reduce the $NO_x$ concentration downstream of the catalytic denitrification unit to the desired level. In this manner, the system avoids unsatisfactory excess ammonia injection and system oscillation.

In the control process, the ammonia addition rate is controlled based on a basic control signal which is generated as a function of the process parameters of fuel composition, combustion temperature, flue gas flow rate, and the catalytic activity in the catalytic denitrification unit, so that initially less ammonia is injected into the flue gas stream than theoretically required. The resulting $NO_x$ concentration of bases downstream from the catalytic denitrification unit is measured and compared with the desired reduced $NO_x$ concentration in the exhaust gas. Then additional ammonia is injected into the flue gas stream as needed until $NO_x$ concentration is further reduced to less than about 15 ppm sufficient to meet the $NO_x$ concentration requirements and avoid excess unreacted ammonia in the treated gases emitted to the atmosphere.

This denitrification control system is useful for various types of fuel combustion systems which generate flue gases containing $NO_x$ compounds, including gas turbines burning natural gas refinery gas, propane, butane or fuel oil, and steam power plant boilers burning such gases, heavy petroleum oils, or coal.

DESCRIPTION OF INVENTION

Figure 1:
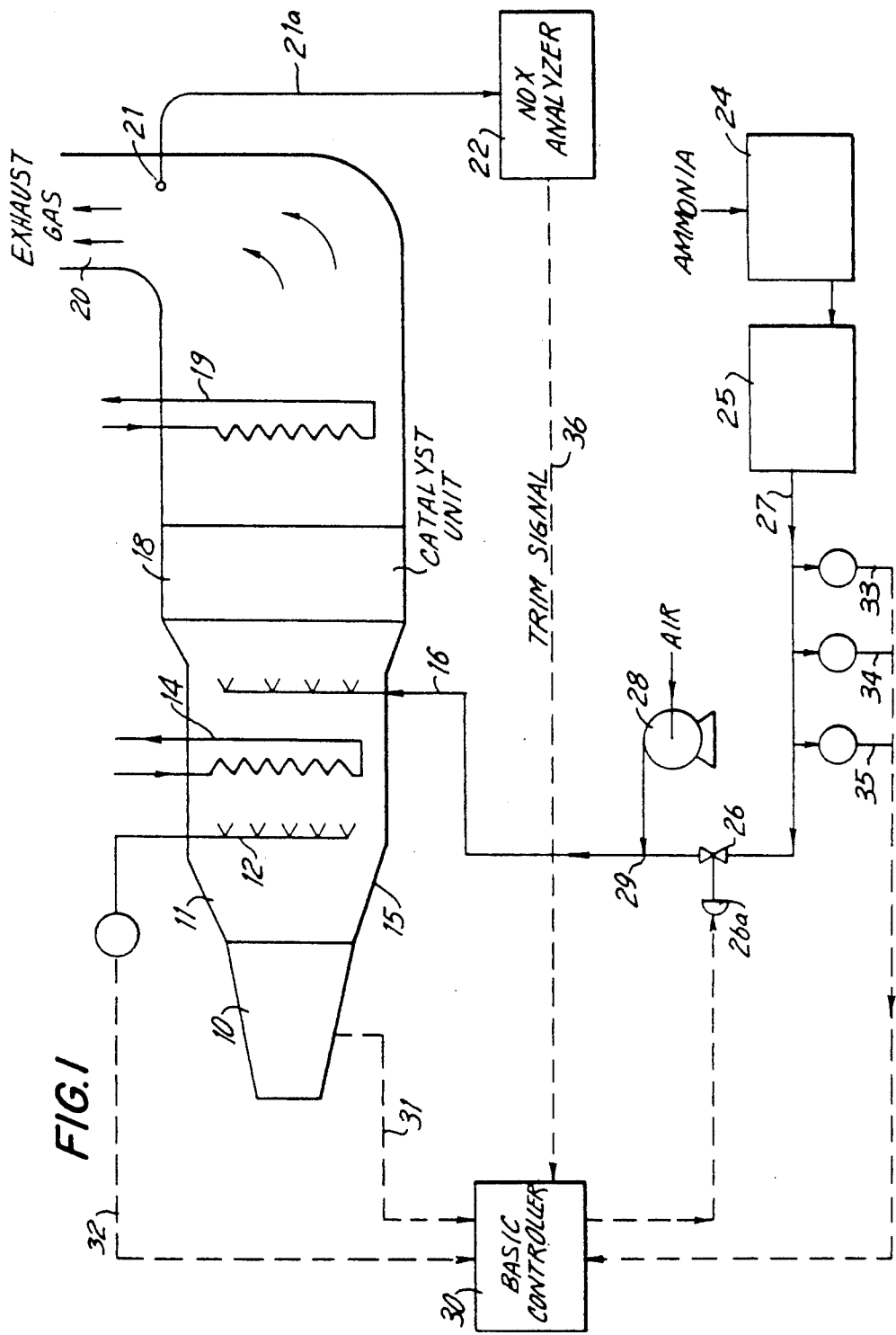
FIG. 1 is a schematic diagram showing a gas turbine power plant with ammonia addition to the turbine exhaust gas stream upstream of a catalytic denitrification reactor, and including a control system for controlling the amount of ammonia addition to the exhaust gas, so as to meet $NO_x$ standards for gases emitted to the atmosphere.

As shown by FIG. 1, an exhaust gas stream 11 containing 25–75 parts per million nitrous oxides is derived by fuel combustion in gas turbine 10, which may include an afterburner 12 for combusting additional fuel. The exhaust gas 11 which has temperatures up to about 2000° F., is passed through a heat exchanger 14 located within casing 15 and the gas is cooled to about 500–1000° F. against a cooler fluid such as refinery fluid streams, air or water. A mixture of ammonia gas and air at 16 is injected by nozzles 17 into the turbine exhaust casing 15 at a location upstream of a catalytic denitrification unit 18, which unit contains a catalyst material suitable for reducing nitrous oxides ($NO_x$) contained in the exhaust gas stream. Such ammonia addition is described by U.S Pat. No. 3,877,683, which is being incorporated herein by reference to the extent needed. The air/ammonia mixture volume ratio should be between about 15:1 and 50:1, and its injection point located to provide 0.3–1 second elapsed time upstream of the catalytic unit. The dentrification unit 18 is preferably a honeycomb type structure having multiple parallel flow passages extending therethrough, with the passage walls having a suitable catalyst material impregnated therein. Useful dentrification catalyst materials may include titanium oxide and vanadium oxide such as are described in U.S. Pat. No. 3,929,670 to Kudo et al, U.S. Pat. No. 4,048,112 to Matsushita, and U.S. Pat. No. 4,085,193 to Nakajima et al.

From the catalytic unit 18, the exhaust gas stream containing reduced nitrous oxides is passed through a second heat exchanger 19 where the gas temperature is further cooled to about 200–600° F. before being discharged through stack 20 to the atmosphere. The nitrous oxide concentration of the exhaust gas in stack 20 is sampled at 21 and the sample passed via tube 21a to an $NO_x$ analyzer device 22.

The ammonia supply required for the ammonia/air mixture 16 which is injected by nozzles 17 into the gas turbine exhaust casing 15 is provided from ammonia liquid storage tank 24. The liquid ammonia is vaporized at 25, and passed through flow control valve 26 which is controlled by controller 26a. Dilution air is provided by blower 28 and added to the ammonia gas stream at 29 to provide the ammonia/air mixture stream 16, which is injected by nozzles 17 into the turbine exhaust gas stream.

Control of the flow of ammonia gas through control valve 26 is provided initially by a basic signal from a controller 30 to the valve controller 26a. This basic signal incorporates several operational parameters of the process. Suitable sensors are provided to derive individual monitoring signals from the important parameters of the turbine operation. The gas turbine exhaust gas flow or its power output is monitored by signal 31, fuel flow to auxiliary burner 12 is provided by signal 32, the parameters of ammonia temperature, pressure and flow rate in conduit 27 are provided by signals 33, 34 and 35. These individual signals are all sent to master controller 30, where they are integrated to provide the basic signal. Also, a trim signal 36 is provided from the $NO_x$ analyzer 22 to the controller 30. Controller 30 compares the desired $NO_x$ outlet concentration with the trim signal 36 obtained from $NO_x$ analyzer 22, and then adds a calculated small fractional amount to the input of controller unit 26a of a control valve 26 as needed so as to inject sufficient ammonia through nozzles 17 into the turbine exhaust gas stream to provide the desired low $NO_x$ content in the exhaust gas passed through denitrification unit 18 to exhaust stack 20 before the ga is discharged to the atmosphere.

Suitable sensing units for providing the signals of turbine power generated or exhaust gas flow, fuel flow to the afterburner, ammonia temperature, pressure and flow rate, and $NO_x$ analyzer as well as master controller 30 are generally known in the art and need not be described further herein.

The gas denitrification control process and system uses a sequencing procedure to prevent injecting excessive ammonia into the exhaust gas. By this procedure, the signals of turbine exhaust gas flow or power output indicate the amount of nitrous oxide usually in the exhaust gas stream, and fed to the controller 30. The signals of ammonia temperature, pressure and flow rate indicate the moles of ammonia being provided, and are also fed to controller 30. The quantity of ammonia injected into the exhaust gas is initially about 80–85% of that theoretically required. Nitrous oxide/concentration in the turbine exhaust gas stream is sensed by analyzer 22, and a trim signal 36 is sent to controller 30 to adjust the control setting of ammonia control valve 26 as needed to produce the desired low concentration of nitrous oxide but avoid excess unreacted ammonia in the exhaust gas emitted from stack 20.

This invention will be further described by a typical example, which should not be construed as limiting the scope of the invention.

EXAMPLE

Exhaust gas discharged from a gas turbine power unit burning natural gas fuel has the following composition;

| TURBINE EXHAUST GAS COMPOSITION. VOLUME % | |
| --- | --- |
| Carbon dioxide | 3.81 |
| Carbon monoxide | 0.00037 |

| -continued | |
| --- | --- |
| TURBINE EXHAUST GAS COMPOSITION. VOLUME % | |
| Argon | 0.92 |
| Nitrogen | 72.50 |
| Nitrous Oxides | 0.00043 |
| Oxygen | 12.48 |
| Water | 10.28 |
| Particulate material | 0 |

Ammonia gas is diluted with air to provide an air/ammonia volume ratio of 20:1, and the mixture is injected into the exhaust gas ahead of a catalytic denitrification unit located in the turbine exhaust casing. The denitrification unit has a honeycomb type construction with a plurality of parallel flow passages each containing vanadium oxide catalyst. The turbine exhaust gas flow, nitrous oxide content, afterburner fuel flow, ammonia temperature, pressure and flow rate are sensed and fed into a controller. In the controller, these signals are integrated and a basic signal is generated which is compared with a trim signal generated by measurement of the $NO_x$ concentration in the exhaust stack downstream of a catalytic denitrification unit, and the flow of ammonia into the exhaust gas stream is continuously adjusted and controlled. After the combined exhaust gas and ammonia pass through the catalytic unit, the nitrous oxides which are released to the atmosphere are substantially reduced to 9 ppm, which is less than that needed to meet local air standards which may vary from region to region of the country.

Thus, by use of this catalytic denitrification control process and system, oxides of nitrogen contained in combustion exhaust gas or other flue gases are reduced from original 20–100 volume parts $NO_x$ per million to less than 15 parts $NO_x$ per million of exhaust gas volume, while avoiding unreacted ammonia in the exhaust gas.

Although this process and system of this invention have been described generally and also by a specific embodiment, it is understood that modifications and variations can be made to the invention which is defined by the claims.

I claim:
1. A process for controlling the catalytic denitrification of flue gases by ammonia addition to the flue gas, said process comprising:
(a) withdrawing from a combustion process a flue gas stream containing at least about 20 volume parts $NO_x$ per million of flue gas, and controllably adding ammonia gas to said flue gas stream;
(b) passing the flue gas and ammonia mixture through a catalytic denitrification unit containing a denitrification catalyst material and reducing the $NO_x$ concentration in the flue gas;
(c) obtaining a control signal based on process parameter signals including the volume flow rate of said flue gas, and determining the quantity of ammonia initially added to the flue gas so that it is less than the amount theoretically required to reduce all of the $NO_x$ in the flue gas;
(d) obtaining a trim signal based on comparing the $NO_x$ concentration measured in the flue gas downstream of the catalytic dentrification unit and a desired $NO_x$ concentration; and
(e) providing additional ammonia injection based on the trim signal by adjusting the ammonia addition flow rate as needed to provide the desired reduced

$NO_x$ concentration in the flue gas being emitted to the atmosphere and to avoid excess ammonia injection and system oscillation.

2. The control process of claim 1, wherein the ammonia flow is diluted with air to provide an air-ammonia volume ratio in the range of 15:1 to 50:1.

3. The control process of claim 1, wherein the ammonia injection is located upstream of the catalytic unit by a distance sufficient to provide an elapsed time for the flue gas flow of 0.3-1 second.

4. The control process of claim 1, wherein the exhaust gas temperature upstream of the denitrification unit is cooled to 500-1000° F.

5. The control process of claim 1, wherein the flue gas is exhausted from a gas turbine and the basic signal includes fuel flow rate to an afterburner provided in the gas turbine exhaust casing upstream of the ammonia injection location.

6. The control process of claim 1, wherein the flue gas is passed through a honeycomb type catalytic denitrification unit containing a catalyst material impregnated therein.

7. The control process of claim 6, wherein the catalyst material includes titanium oxide, vanadium oxide, or platinum.

8. The control process of claim 1, wherein the basic signal includes parameters of flue gas flow rate and nitrous oxide content, and the ammonia temperature, pressure and flow rate.

9. A process for controlling the catalytic denitrification of exhaust gas from a gas turbine by ammonia addition to the exhaust gas, said process comprising:

(a) withdrawing from a gas turbine an exhaust gas stream containing at least about 20 volume parts $NO_x$ per million parts of exhaust gas, and controllably injecting an ammonia-containing gas stream into said exhaust gas stream so that the amount of ammonia is less than the amount theoretically required to reduce all of the $NO_x$ in the exhaust gas;

(b) passing said exhaust gas and ammonia mixture through a honeycomb type catalytic denitrification unit containing a denitrification catalyst, and initially reducing $NO_x$ concentration of the exhaust gas;

(c) generating a basic control signal based on process parameter signals of exhaust gas flow rate and $NO_x$ content, and the ammonia temperature, pressure and flow rate;

(d) providing a trim signal based on comparing said basic signal with $NO_x$ concentration of the exhaust gas at a location downstream of said catalytic denitrification unit and desired $NO_x$ concentration; and (e) providing additional ammonia injection based on the trim signal by adjusting the ammonia injection rate as needed to provide the desired reduced $NO_x$ concentration in the turbine exhaust gas being emitted to the atmosphere and to avoid excess ammonia injection and system oscillation.

10. The control process of claim 1, wherein the initial quantity of ammonia added is 80-85% of the amount theoretically required.

11. The control process of claim 10, wherein the process parameter signals, upon which the control signal is based, further include combustion temperature; fuel composition and catalytic activity in the catalytic denitrification unit.

* * * * *